Figure 1:
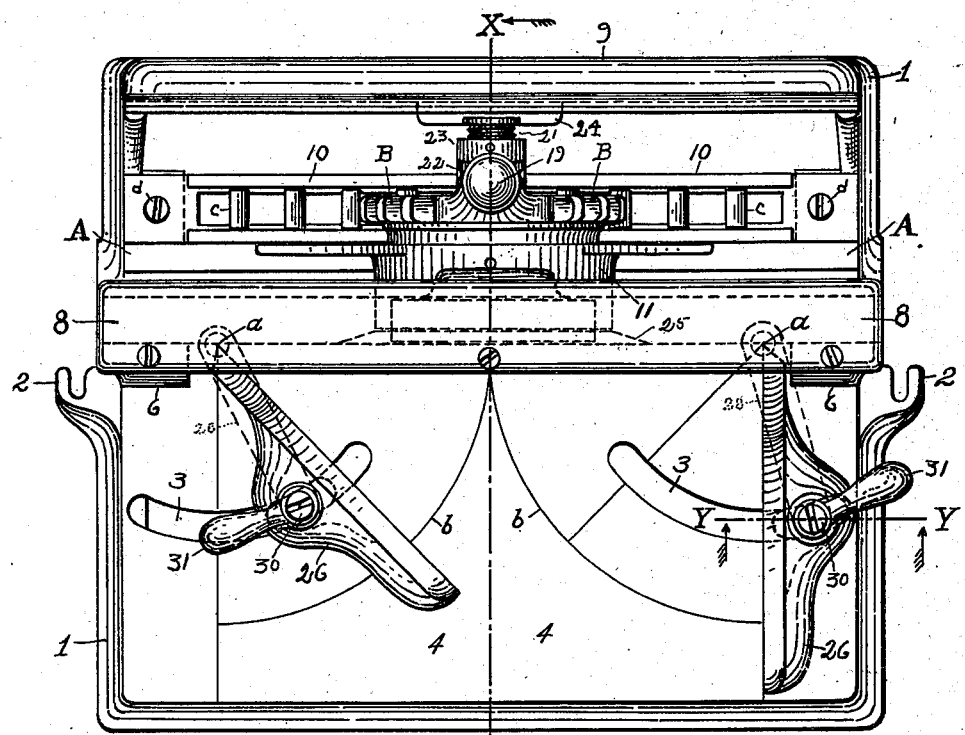

No. 724,176. PATENTED MAR. 31, 1903.
W. N. GARTSIDE.
TRIMMER.
APPLICATION FILED JUNE 23, 1902.
NO MODEL. 2 SHEETS—SHEET 1.

Witnesses:
J. C. Duvall.
H. E. Randle.

Inventor:
W. N. GARTSIDE,
by his attorney,
Robert W. Randle.

No. 724,176. PATENTED MAR. 31, 1903.
W. N. GARTSIDE.
TRIMMER.
APPLICATION FILED JUNE 23, 1902.
NO MODEL. 2 SHEETS—SHEET 2.
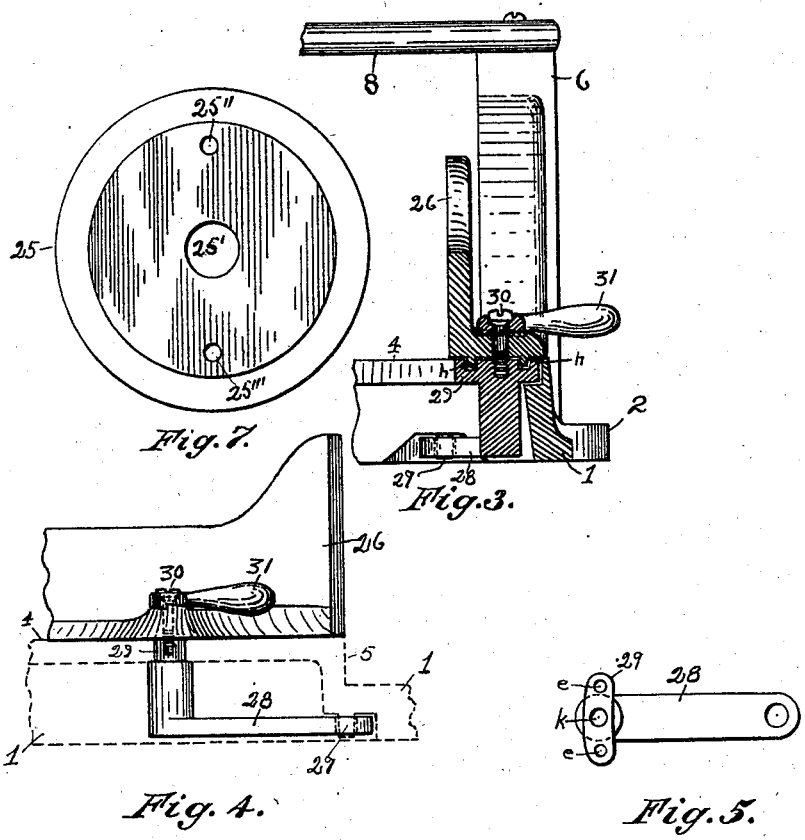
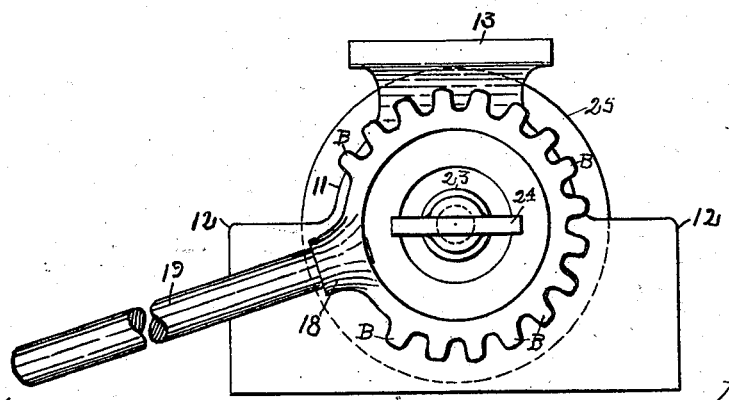
Witnesses:
S. C. Duvall.
R. E. Randle.
Inventor:
W. N. GARTSIDE;
by his attorney,
Robert W. Randle.

UNITED STATES PATENT OFFICE.

WILLIAM N. GARTSIDE, OF RICHMOND, INDIANA.

TRIMMER.

SPECIFICATION forming part of Letters Patent No. 724,176, dated March 31, 1903.

Application filed June 23, 1902. Serial No. 112,802. (No model.)

*To all whom it may concern:*

Be it known that I, WILLIAM N. GARTSIDE, a citizen of the United States, residing in the city of Richmond, in the county of Wayne and State of Indiana, have invented new and useful Improvements in Trimmers; and I do hereby declare the following to be a full, clear, and exact description of the invention, such as will enable others skilled in the art to which it appertains to make and use the same.

This invention relates to a device composed of interdependent and coöperating parts arranged to be operated by hand for trimming wood or other fibrous materials.

The invention has for its object the provision of a trimming mechanism whereby the ends of wooden or other fibrous materials may be cut off or trimmed smoothly, easily, and quickly at any desired angle.

Another object is to provide a trimmer composed of a minimum of parts consistent with the various operations which it is adapted to perform, which will be neat and attractive in appearance, strong and durable in its several parts, and capable of a wide scope of usefulness and efficiency.

Another object is the provision of a trimmer which will be simple in character, compact in form, easily operated and maintained, and whereby the operator will be enabled to control the trimmer, so that its work will be performed with certainty and precision.

Other objects and advantages of my invention will appear from the following specification and from the drawings forming a part thereof.

The invention consists in a trimmer embodying certain new, useful, and novel features and details of construction and relative disposition of parts, as hereinafter particularly set forth, illustrated in the drawings, and incorporated in the claims hereunto appended.

In detail the invention relates to trimmers substantially as shown in the accompanying drawings, in which—

Figure 2:
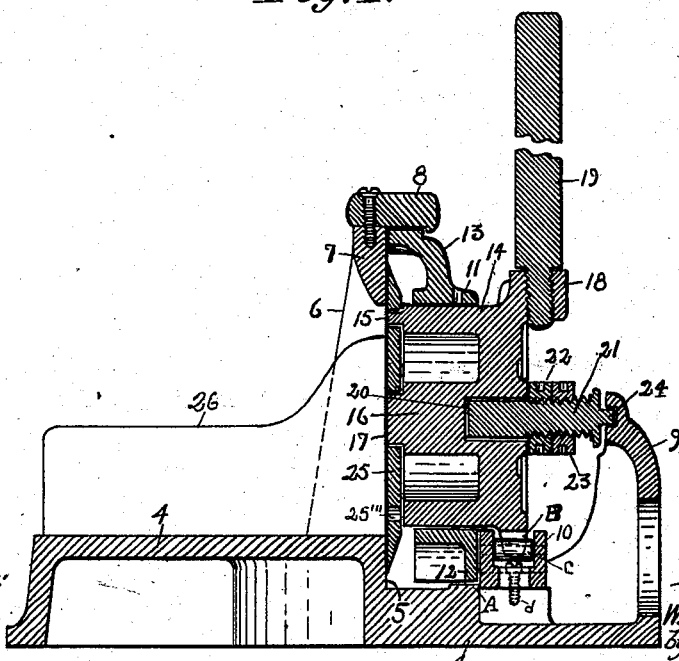

Figure 1 is a plan view of my entire invention. Fig. 2 is a cross-section of same, taken on the line X X of Fig. 1 looking in the direction of the arrows. Fig. 3 is a detail sectional view taken on the line Y Y of Fig. 1 looking in the direction of the arrows. Fig. 4 is a detail elevation of the angle-adjusting mechanism. Fig. 5 is a detail plan of the radial arms. Fig. 6 is a detail elevation of the cutting mechanism. Fig. 7 is a detail view of the circular cutting-knife.

Similar letters and figures of reference denote and refer to like parts throughout the several views.

In the following description for convenience the top of the plan shown in Fig. 1 is regarded as the rear, the bottom as the front. The line X X divides the device into two equal parts which are exact duplicates of each other oppositely disposed, and a description of one will be considered a description of the other when not otherwise stated.

Referring now to the drawings by reference characters, 1 represents the base or frame of the device, which is adapted to rest level on a bench, table, or the like, to which it may be secured by screws or bolts adapted to engage in the slots formed by the hooks 2 and 2. The top surface of the front half of the base (represented by 4) should be a perfectly level polished face, through which are formed the two oppositely-disposed curved slots 3 3, the respective lines of which are equidistant from the respective points *a a*, and corresponding with the lines of said slots, with their inner ends terminating at a common point at the center of the front edge of the face 4, are the lines *b b*, which may be provided with graduated scales for determining desired angles. Adjoining the rearward edge of the face 4 and at right angles thereto is the downwardly-projecting knife-contacting face 5.

Rising from the center of the right and left ends of the base 1, the same being integral parts of the base 1, are the standards 6 6, connected by the integral horizontal member 7. The rear faces of the standards 6 6 and the member 7 are on a line with each other and with the face 5 and are at right angles to the face 4, forming knife-contacting faces. Secured on top of the member 7 and extending over to the front is the cap 8, with a channel formed in its projecting under face.

Rising from the rear corners of the base 1 are two posts or standards, connected at their tops by the integral horizontal guide member 9, which is provided with a forward-projecting face, in which I provide a channel or groove. Said member 9 and its supporting-posts are all integral of the base 1.

Secured to the base 1, extending from side to side thereof between the guide 9 and the standards 6 6, is a rack 10, the engaging cross members of which are provided with bearings adapted to revolve thereon. The rack 10 may be an integral part of the base 1 or it may be made removable, as shown, and secured to the base 1 by the screws $d$ $d$.

Extending across the base 1 immediately in the rear of the rack 10 is an upwardly-extending guide-face A.

The cutting mechanism and carriage therefor consists of a circular ring 11, provided with outwardly and slightly downwardly projecting integral wings 12 and an integral upwardly-projecting guide-block 13. The lower edges of the wings 12 are adapted to travel on the face A, and the guide-block 13 is adapted to travel in the channel of the cap 8. The circular opening through the ring 11 is adapted to receive revolubly therein the circular hollow block 14, the face of which is provided with a small stud 15, and a core 16 extends to the front from the forward closed face thereof and is provided with a comparatively larger central stud or arbor 17. Extending out from the rear end of the periphery of the block 14 are a number of teeth B, whose number and size correspond substantially with the number and size of the teeth $c$ in the rack 10, with which they are adapted to engage. At one point a number of the teeth B are omitted, and in place thereof I provide an internally-threaded socket 18 to receive the threaded end of the operating-lever 19. Into the center of the front face of the block 14 I provide a rearwardly-extending smooth socket 20, adapted to receive the axle 21. The rear half of the axle 21 is threaded to receive a pair of lock-nuts 22 and 23, and the rear end is provided with a head which carries the guide-block 24, which latter is adapted to slide in the channel in the guide 9.

25 represents a circular knife with a central opening 25', adapted to receive the arbor 17, and with oppositely-disposed openings 25" and 25''' on a line with said central opening. Either of the openings 25" or 25''' is adapted to receive the stud 15.

The guide adjusting and retaining mechanism consists, essentially, of two oppositely-disposed radial guides 26, adapted to be adjusted on the surface 4 with perfectly true centrally-facing surfaces at all times at right angles to the surface 4, and their under surfaces contacting with and adapted to be moved over the surface 4 within a certain radius from the stationary points $a$ $a$, respectively. Extending down into the cavity from the under side of the base 1 are the two studs 27, the centers of which are directly beneath the points $a$ $a$. Journaled on the studs 27 are radial arms 28, which reach to points directly beneath the respective curved slots 3 and extend upward in cylindrical form to underneath said slots, through which they extend to the level of the surface 4. The portions lying in said slots conform to the contour thereof, forming plates 29. The surfaces of the plates 29 are each provided with a pair of sockets $e$, adapted to receive the studs $h$, extending down from the under surface of the radial guides 26, and the centers of the plates 29 are provided with threaded sockets $k$ to receive the respective screws 30. Extending through the base of the two radial guides 26 at points directly over the centers of the curved slots 2 are openings through which may pass the respective screws 30, and mounted on the base of each of the radial arms 26 are the eccentrically-faced levers 31, through the inner ends of which pass the screws 30. The screws 30, passing through the levers 31 and the openings in the radial guides 26, are inserted in the respective openings $k$ of the plates 29, thus holding said parts together, and by means of the cam the levers 31 may be given approximately a half-turn to tightly clamp the radial guide to the face 4 at any determined angle or to release the pressure to allow the radial guides to be moved to any determined angle, said guides being carried by the radial arms 28.

From the arrangement described and shown it is apparent that the knife 25 is adapted to be placed in position on the front face of the block 14, being centered and supported by the arbor 17 and carried rotatably therewith by the stud 15. The face of the knife is held in place by its contact with the face 5 and the face of the member 7. By rotating the mechanism on the rack toward one end until the cogs of the block are disengaged from the rack it is apparent that the parts shown in Fig. 6 can be removed and the knife can be lifted from its position and entirely separated, as shown in Fig. 7. The pressure of the face of the knife against the face 5, the face of the member 7, and the faces of the standards 6 can be adjusted by the nut 22, and the nut 22 can be locked in position at the desired point on the axle 21 by the nut 23 being tightly contacted therewith.

It is apparent that by moving the lever 19 alternately to the right and left the knife 25 will be carried revolubly and alternately to the right and left across the space formed between the rear edge of the face 4, the standards 6, and the member 7, and by adjusting one of the guides 26 to the desired angle that a section of wood or the like laid on the surface 4 against said guide and extending slightly rearward over the edge of the face 5 the knife 25 will engage and sever the extended portion of said wood or the like smoothly and accurately at the predetermined angle. In operation approximately only one-half of the cutting edge of the knife 25 is brought into action, and when this portion becomes dulled the position of the knife on the block 14 can be reversed—that is, the position of the knife can be changed to bring the stud 15 into engagement with either of the openings 25″ or 25‴.

From the above description, taken in connection with the accompanying drawings, it will be seen that I have produced an improved trimmer embodying the objects elsewhere referred to in this specification.

While I have illustrated and described the best means now known to me for carrying out my invention, I wish it to be understood that I do not restrict myself to the exact details of construction shown, but hold that any slight changes or variations in such details as would suggest themselves to the ordinary mechanic would fall within the limit and scope of my invention.

I wish it understood that I do not dedicate any part of my invention to the public and that I wish adequate and just protection for every feature of the invention and the various parts thereof herein shown and described that is new and useful and which involves invention.

The terms "inward," "outward," "right," "left," "face," and other similar terms are used for convenience of description, and it is not intended by their use to limit the arrangement of the parts to the relative positions indicated.

Having now fully shown and described my invention and the best mode for its construction to me known at this time, what I claim as new, and desire to secure by Letters Patent of the United States, is—

1. In a trimmer, the combination of a base, provided with a level surface 4 and rearwardly-facing surfaces at right angles thereto on a line with the rear edge thereof; of the movable cutting mechanism consisting of a ring 11 with wings extending out therefrom, the lower edges of said wings adapted to travel on the face A, a guide-block extending upward from the ring 11 adapted to travel in the groove in the cap 8; of the block 14, adapted to rotate in said ring, carrying in the forward edge of its periphery the gear-teeth B, whose pitch-line is of smaller diameter than the diameter of the knife 25, adapted to operate in the rack 10; of the stud 15 extending out from the face of the block 14, near its periphery, and the central arbor 17 extending out from the core of the block 14; of the socket 20 extending into the center of the front face of the block 14; of the axle 21 carried in said socket 20, carrying on its rearward end a guide-block 24 adapted to operate in the groove in the guide 9; of the locknuts 22 and 23 surrounding the axle 21; of the circular knife 25 carried by the arbor 17 and the stud 15; and the lever 19 to rotate said parts, all substantially as shown and described.

2. In a trimmer, the combination of a base 1 with a level upper surface 4, of a pair of radial guides 26 mounted on the surface 4, over which they are adapted to be moved, provided with downwardly-projecting studs $h$, of the studs 27 extending down from the base 1, the centers of which are on a line with the points $a$, of the radial arm 28 mounted on said studs 27 and extending outward and upward to the under side of the slots 3, of the plate 29 adapted to slide in the slots 3 and secured to the arms 28, with sockets $e$ in their upper surfaces to receive the studs $h$, and central threaded sockets $k$ to receive the screws 30, of the eccentric lever 31 and the screws 30 by which the radial guides 26 are secured to the arms 28 and contacted or released from the surface 4, all substantially as shown and described.

In testimony whereof I have hereunto signed my name in the presence of two subscribing witnesses.

WILLIAM N. GARTSIDE.

Witnesses:
R. W. RANDLE,
R. E. RANDLE.